(12) United States Patent
Chaubey et al.

(10) Patent No.: US 11,645,924 B2
(45) Date of Patent: May 9, 2023

(54) VARIABLE ENERGY MANAGEMENT METHODS AND SYSTEMS

(71) Applicant: HONEYWELL INTERNATIONAL INC., Charlotte, NC (US)

(72) Inventors: Rajesh Chaubey, Bangalore (IN); Daniel E. Lewis, Glendale, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 159 days.

(21) Appl. No.: 17/127,504

(22) Filed: Dec. 18, 2020

(65) Prior Publication Data

US 2022/0139234 A1 May 5, 2022

(30) Foreign Application Priority Data

Oct. 29, 2020 (IN) ............................. 202011047237

(51) Int. Cl.
*G08G 5/00* (2006.01)

(52) U.S. Cl.
CPC ......... *G08G 5/0039* (2013.01); *G08G 5/0017* (2013.01); *G08G 5/0047* (2013.01)

(58) Field of Classification Search
CPC .. G08G 5/0039; G08G 5/0017; G08G 5/0047; G08G 5/0091; G08G 5/025; G08G 5/0021; G05D 1/0607
See application file for complete search history.

(56) References Cited

U.S. PATENT DOCUMENTS

| | | | |
|---|---|---|---|
| 8,170,727 | B2 | 5/2012 | Deker |
| 8,447,442 | B2 | 5/2013 | Sacle et al. |
| 8,527,173 | B2 | 9/2013 | Lacoste et al. |
| 8,924,047 | B2 | 12/2014 | Dewas et al. |
| 8,948,937 | B2 | 2/2015 | Constans et al. |
| 8,996,204 | B2 | 3/2015 | Ishihara et al. |
| 9,026,275 | B1 | 5/2015 | Young et al. |
| 9,646,503 | B2 | 5/2017 | Kawalkar et al. |
| 2013/0218374 | A1 | 8/2013 | Lacko et al. |
| 2014/0343766 | A1 | 11/2014 | Le Gall et al. |
| 2015/0120100 | A1* | 4/2015 | Sacle .................. G08G 5/0095 701/18 |
| 2018/0284813 | A1 | 10/2018 | Boyer et al. |
| 2018/0370645 | A1 | 12/2018 | Durand et al. |
| 2019/0371187 | A1 | 12/2019 | Moravek et al. |

* cited by examiner

*Primary Examiner* — Shon G Foley
(74) *Attorney, Agent, or Firm* — Lorenz & Kopf LLP

(57) ABSTRACT

Methods and systems are provided for assisting operation of a vehicle deviating from a desired manner of operation, such as an aircraft deviating from a planned trajectory. One method involves identifying a current aircraft altitude, identifying a current aircraft configuration, determining a recommended flight path from the current aircraft altitude for satisfying an upcoming constraint associated with a reference descent strategy based at least in part on the current aircraft configuration in response to a deviation between the current aircraft altitude a target altitude according to the reference descent strategy, and providing an output influenced by the recommended flight path. The recommended flight path includes a recommended vertical profile and a recommended speed profile, and the recommended flight path is configured to vary at least one of a kinetic energy or a potential energy of the aircraft along the recommended flight path en route to the upcoming constraint.

18 Claims, 5 Drawing Sheets

VARIABLE ENERGY MANAGEMENT METHODS AND SYSTEMS

CROSS REFERENCE TO RELATED APPLICATION

This application claims priority to Indian Provisional Patent Application No. 202011047237, filed Oct. 29, 2020, the entire content of which is incorporated by reference herein.

TECHNICAL FIELD

The subject matter described herein relates generally to vehicle systems, and more particularly, embodiments of the subject matter relate to aircraft systems that facilitate energy management for recapturing a desired trajectory while maintaining compliance with applicable constraints.

BACKGROUND

Often, it is desirable to operate an aircraft in stable manner when descending and approaching an airport in order to land safely and avoid hard landings or other actions that could increase stress on the aircraft, which may increase maintenance or inspection costs. Additionally, altitude constraints, speed constraints, and the like may be provided by airport procedures, air traffic control (ATC), or the like in order to improve flight safety and/or manage air traffic. However, the various altitude, speed, and other stability constraints typically do not account for operating costs. Accordingly, a flight management system (FMS) is often utilized to determine a cost-efficient or optimal trajectory that satisfies the applicable altitude, speed, and stability constraints using a cost function or cost index that accounts for a variety of different factors (e.g., fuel remaining, aircraft weight, meteorological conditions, and the like). In practice, however, various circumstances such as adverse weather conditions, on-board malfunctions, low quality of air traffic control, bad crew cooperation, fatigue, visual illusions, inexperienced crew members, and the like can result in the aircraft deviating from the FMS-computed trajectory and risking stability or noncompliance with required constraints, which could compromise safety.

Various techniques have been developed to help facilitate stabilization when an aircraft deviates from an originally-planned trajectory. However, existing approaches generally require a pilot manually operate the aircraft and determine how to restore stability and comply with other constraints, without guidance for how to restore the originally-planned trajectory, and which results in increased fuel consumption, noise, or other costs relative to the originally-planned trajectory. Accordingly, it desirable to provide guidance or automation that facilitates cost optimization by recapturing an originally-planned trajectory and managing aircraft energy for compliance with upcoming constraints.

BRIEF SUMMARY

Methods and systems are provided for assisting operation of a vehicle, such as an aircraft. One method for assisting operation of an aircraft en route to an airport involves identifying a current altitude for the aircraft, identifying a current configuration of the aircraft, in response to a deviation between the current altitude for the aircraft and a target altitude according to a reference descent strategy, determining a recommended flight path for satisfying an upcoming constraint associated with the reference descent strategy from the current altitude based at least in part on the current configuration, and providing an output influenced by the recommended flight path. The recommended flight path includes a recommended vertical profile and a recommended speed profile, and the recommended flight path is configured to vary at least one of a kinetic energy or a potential energy of the aircraft along the recommended flight path en route to the upcoming constraint.

In another embodiment, method of assisting operation of an aircraft to recapture an optimal trajectory en route to an airport is provided. The optimal trajectory is configured to satisfy a constraint in advance of the airport. The method involves identifying a current energy state for the aircraft at a current location of the aircraft, identifying a current drag configuration of the aircraft, determining a variable energy management strategy for reducing a deviation between the current energy state and a target energy state at the current location according to the optimal trajectory based on the deviation, iteratively constructing a recommended flight path for recapturing the optimal trajectory forward from the current location using the variable energy management strategy, and outputting indication of the recommended flight path, wherein a flight path angle defined by the respective vertical profiles for the sequence of segments varies along the recommended flight path prior to recapturing the optimal trajectory. The recommended flight path includes a sequence of segments, wherein iteratively constructing the recommended flight path comprises determining a constraining value for a variable energy management parameter associated with the variable energy management strategy based at least in part on an aircraft drag configuration at the start of the respective segment and a respective deviation from the optimal trajectory at the start of the respective segment and optimizing a respective vertical profile and a respective speed profile for the respective segment to achieve the constraining value for the variable energy management parameter based at least in part on the aircraft drag configuration at the start of the respective segment.

In another embodiment, an aircraft system is provided. The aircraft system includes a navigation system to provide a current altitude of an aircraft, a data storage element to maintain one or more constraints defining a flight plan for the aircraft, and a flight management system coupled to the navigation system and the data storage element to determine a reference trajectory based at least in part on the one or more constraints, identify a variable energy management strategy for reducing a difference between the current altitude and a target altitude according to the reference trajectory based on the difference, and generate a recommended flight path for recapturing the reference trajectory using the variable energy management strategy. The recommended flight path comprises a sequence of segments, each segment of the sequence of segments has a respective vertical profile and a respective speed profile associated therewith, and the respective vertical profile and the respective speed profile associated with the respective segment are configured to achieve a constraining value determined for a variable energy management parameter associated with the identified variable energy management strategy.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
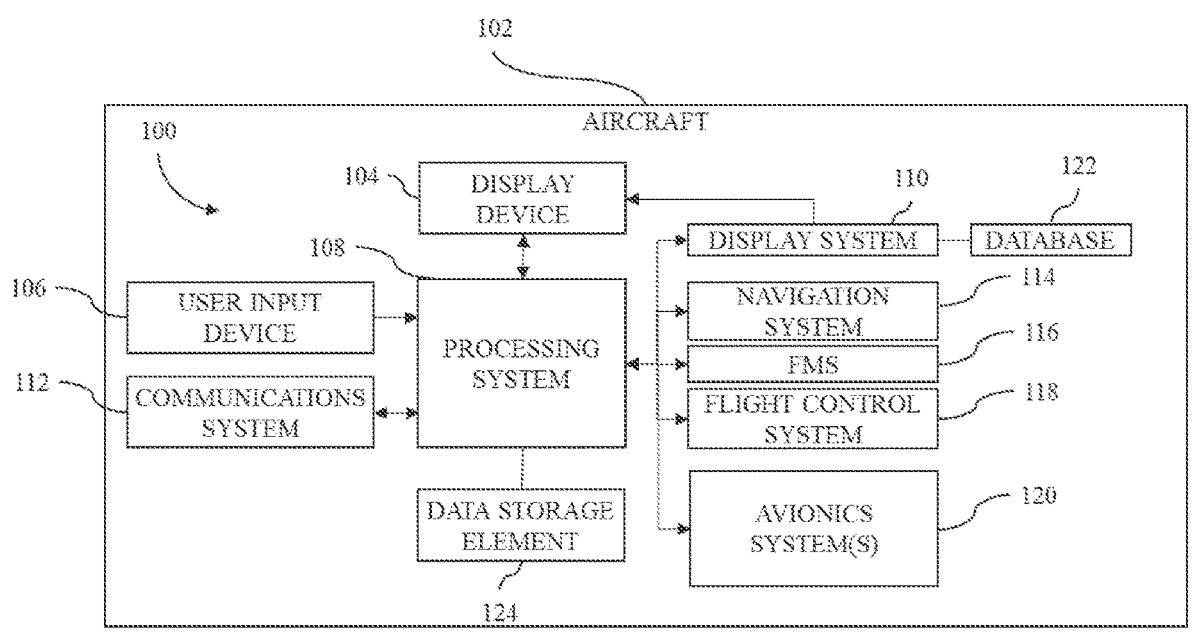
FIG. 1 is a block diagram of a system for an aircraft in one or more exemplary embodiments.

Embodiments of the subject matter described herein generally relate to systems and methods for recapturing a previously-planned trajectory by managing energy to improve compliance with upcoming constraints. While the subject matter described herein could be utilized in various applications or in the context of various types of vehicles (e.g., automobiles, marine vessels, trains, or the like), exemplary embodiments are described herein in the context of an aircraft. In particular, the subject matter is described primarily in the context of a piloted or manned aircraft, although it should be appreciated the subject matter can be implemented in an equivalent manner for unmanned aerial vehicles, urban air mobility vehicles, helicopters, rotorcraft, and the like.

As described in greater detail below, exemplary embodiments described herein determine a recommended flight path from the current position of the aircraft for recapturing a previously-planned reference descent strategy and a satisfying an upcoming constraint associated with the reference descent strategy by varying the kinetic energy or potential energy of the aircraft en route to the upcoming constraint. In exemplary embodiments, the previously-planned reference descent strategy is realized as an optimal descent strategy that includes an altitude profile (or vertical profile) and a speed profile that were calculated or otherwise determined by a flight management system (FMS) to satisfy any applicable altitude, speed, required time of arrival (RTA) and/or stabilization constraints. For example, an FMS-computed optimal vertical descent profile may be configured to result in the aircraft arriving at a desired horizontal or lateral ground distance ahead of its destination landing location (e.g., a stabilization distance) at an altitude, airspeed and aircraft configuration (e.g., a stable energy state) that allow adequate dissipation of the remaining aircraft energy during final approach, touchdown and rollout. In one or more embodiments, the altitude and speed profiles computed by the FMS may also be optimized in accordance with a cost function or otherwise configured to achieve a desired cost index value.

Based on the deviation between the current aircraft altitude and/or the current aircraft speed at the current aircraft position along the planned lateral trajectory for the aircraft and the targeted aircraft altitude and/or the targeted aircraft speed at the current aircraft position along the planned lateral trajectory, one or more energy management strategies are identified for reducing the deviation between the current aircraft state and the targeted aircraft state according to the reference descent strategy. Using the one or more identified energy management strategies, the recommended flight path is incrementally constructed forward from the current aircraft state as a sequence of segments in a piecewise manner until intersecting the reference descent strategy. Each segment of the recommended flight path is defined by an altitude profile and a corresponding speed profile that are configured to adjust the potential energy and/or kinetic energy of the aircraft along that segment at a rate that is determined on a per-segment basis. As a result, the rate at which any given segment of the recommended flight path is configured to adjust the potential energy and/or kinetic energy of the aircraft while traversing that segment may be different from the rate(s) of energy adjustment for the preceding and/or following segment(s), such that the potential energy and/or kinetic energy increase or decrease at variable rates along the recommended flight path.

The resulting sequence of altitude and speed profile segments for the recommended flight path may be utilized to autonomously operate the aircraft to recapture the reference descent strategy or to otherwise provide strategic guidance to a pilot operating the aircraft. In this regard, an autonomous operating mode may be utilized to resolve the deviation(s) and recapture the reference descent strategy and satisfy upcoming constraints in situations where the current aircraft state may otherwise be considered to be too high, too low, too fast, and/or too slow to satisfy the upcoming constraint or otherwise achieve an optimal descent strategy, that is, situations where a pilot manually flying the aircraft may be unable to intuitively ascertain how to operate the aircraft to satisfy the constraints.

FIG. 1 depicts an exemplary embodiment of a system 100 which may be located onboard a vehicle, such as an aircraft 102. The system 100 includes, without limitation, a display device 104, a user input device 106, a processing system 108, a display system 110, a communications system 112, a navigation system 114, a flight management system (FMS) 116, a flight control system (FCS) 118, one or more avionics systems 120, and one or more data storage elements 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historical meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in an exemplary embodiment, the navigation system 114 includes inertial reference sensors capable of obtaining or otherwise determining the attitude or orientation (e.g., the pitch, roll, and yaw, heading) of the aircraft 102 relative to earth.

In an exemplary embodiment, the processing system 108 is also coupled to the FMS 116, which is coupled to the navigation system 114, the communications system 112, the flight control system 118, and one or more additional avionics systems 120 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 120, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, hydraulics systems, pneumatics systems, environmental systems, electrical systems, engine systems, trim systems, lighting systems, crew alerting systems, electronic checklist systems, detection systems, an electronic flight bag and/or another suitable avionics system.

Still referring to FIG. 1, the flight control system 118 generally represents the component(s) of the aircraft 102 that are coupled to the FMS 116 and one or more of the other onboard systems 108, 110, 112, 114, 120 to receive or otherwise obtain a lateral trajectory and corresponding altitude and speed profiles from the FMS 116 and autonomously operate the aircraft 102 in accordance with the FMS-computed trajectories. For example, the FMS 116 may store or otherwise maintain a sequence of waypoints or procedures that define a planned route for a flight plan, along with other altitude, speed and/or RTA constraints that may be defined for the flight plan. The constraints be entered manually by the pilot, coded as part of a procedure to be flown as part of the flight plan, and/or assigned by air traffic control. The FMS 116 calculates or otherwise determines a lateral trajectory for the flight plan utilizing the waypoints and/or procedures defined for the flight plan, and calculates or otherwise determines a vertical profile for the aircraft 102 to fly for the lateral trajectory defined by the flight plan that satisfies applicable altitude constraints using aircraft performance predictions, expected meteorological information or other environmental factors, and potentially other constraints or criteria. The FMS 116 constructs a vertical profile that satisfies the relevant altitude constraints, which define windows that the aircraft 102 may pass through vertically while traveling the lateral trajectory. In conjunction with the lateral trajectory and vertical profile, the FMS 116 calculates or otherwise determines a speed profile that satisfies any relevant speed constraints and/or RTA constraints and achieves a desired aircraft performance (e.g., an input cost index value). The FMS 116 then outputs or otherwise provides commands or other indicia of the planned lateral trajectory and the optimal vertical profile and speed profile to be flown to the FCS 118 for implementation.

In one or more embodiments, the FCS 118 includes flight director, an autopilot system (or autopilot), and a thrust management system (or thrust manager). The flight director generally represents a process, service, software or firmware component that is executed, generated or otherwise implemented by the FCS 118 to autonomously command or otherwise control operation of the autopilot and the thrust manager in accordance with an autonomous operating mode that has been selected or otherwise activated. In this regard, the autopilot generally represents the process, service, software or firmware component that is executed, generated or otherwise implemented by the FCS 118 to autonomously command or otherwise control operation of the flight control surfaces of the aircraft 102 to regulate the pitch of the aircraft 102 to achieve a desired flight path angle and/or vertical speed and regulate the roll of the aircraft 102 to achieve a desired lateral trajectory. The deceleration rate manager 214 generally represents the process, service, software or firmware component that is executed, generated or otherwise implemented by the FCS 118 to autonomously command or otherwise control operation of the engines to regulate the speed or thrust produced and achieve the targeted speed profile. For example, when a vertical navigation (VNAV) autonomous operating mode is selected or otherwise activated, the flight director utilizes the vertical profile provided by the FMS 116 to generate corresponding commands or instructions for the autopilot and the thrust manager to autonomously operate the aircraft 102 in accordance with the vertical profile and speed profile provided by the FMS 116, thereby satisfying any applicable altitude constraints, speed constraints, or other criteria or conditions of the flight plan. It should be noted that there are numerous different autonomous operating modes that may be supported by the FCS 118 and/or the flight director, and the subject matter described herein is not limited to any particular type, number, or combination of autonomous operating modes that may be supported.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, various features and/or functionality of processing system 108 described herein (or a subset of features and/or functionality described in the context of the processing system 108) can be implemented by or otherwise integrated with the features and/or functionality provided by the display system 110, the FMS 116 and/or another onboard avionics system 120 (e.g., flight control system), or vice versa. In other words, some embodiments may integrate the processing system 108 with the display system 110, the FMS 116, the FCS 118 or another onboard avionics system 120; that is, the processing system 108 may be a component of the display system 110, the FMS 116, the FCS 118 or another onboard avionics system 120.

Figure 2:
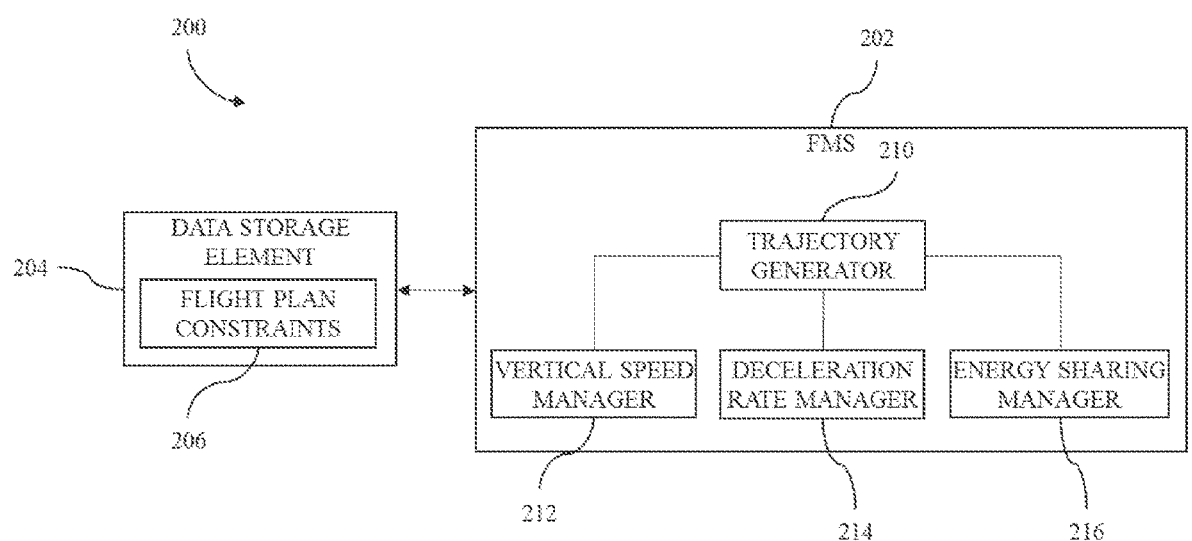
FIG. 2 is a block diagram of a trajectory projection system suitable for use with the aircraft of FIG. 1 in one or more exemplary embodiments.

FIG. 2 depicts an exemplary embodiment of a trajectory projection system 200 suitable for use with an aircraft, such as aircraft 102 of FIG. 1. The illustrated trajectory projection system 200 includes, without limitation, a FMS 202 (e.g., FMS 116) and a data storage element 204 (e.g., data storage element 124) that stores or otherwise maintains the various constraints 206 that define a flight plan to be flown by an aircraft. In this regard, the flight plan constraints 206 include information identifying the procedures or waypoints and their corresponding geographic locations (e.g., latitude and longitude coordinates) that define the lateral route to be flown by the aircraft, along with information identifying any altitude constraints associated with various waypoints of the flight plan (e.g., the type of altitude constraint and the constraining altitude value for a respective waypoint), information identifying any speed constraints associated with various waypoints of the flight plan (e.g., the type of speed constraint and the constraining speed value for a respective waypoint), and information identifying any RTA constraints associated with various waypoints of the flight plan (e.g., the required time of arrival for a respective waypoint). The flight plan constraints 206 may also include stabilization constraints or criteria, such as, for example, a geographical location of a stabilization target point, an aircraft configuration state associated with the stabilization target point (e.g., landing gear extended, predefined flap angle, speed-brakes retracted, etc.), a target speed or target speed range at the stabilization target point, a maximum descent rate associated with the stabilization target point, and/or the like. For example, U.S. Patent Publication No. 2013/0218374 provides an exemplary list of stabilization criteria upon reaching a stabilization target point corresponding to a position along an approach that is 1000 feet above ground level (for instrument meteorological conditions) or 500 feet above ground level (for visual meteorological conditions).

In the illustrated embodiment, the FMS 202 includes a trajectory generation system (or trajectory generator) 210, which generally represents a process, service, software or firmware component that is executed, generated or otherwise implemented by the FMS 202 to compute, calculate, or otherwise determine a planned lateral trajectory for the aircraft for flying the flight plan defined by the constraints 206 along with corresponding vertical profiles and speed profiles for the aircraft that are configured to satisfy the altitude, speed, RTA, stabilization, and/or other constraints associated with the flight plan. In this regard, the trajectory generator 210 may utilize one or more aerodynamic models to model or otherwise predict the performance of the aircraft along the planned lateral trajectory as a function of the aircraft gross weight, fuel remaining, forecasted and/or expected meteorological conditions along the route and calculate or otherwise determine corresponding vertical and speed profiles for the planned lateral trajectory that satisfy the applicable altitude, speed, RTA and/or stabilization flight plan constraints 206. In exemplary embodiments, the vertical profile and the speed profile are optimized to minimize the value of a cost function or otherwise achieve a desired cost index, as will be appreciated in the art. In this regard, the initial vertical profile and speed profile output by the trajectory generator 210 represent the optimal manner in which the planned lateral trajectory should be flown to achieve the desired tradeoffs between fuel consumption, travel time, noise, and/or the like. The planned lateral trajectory, the optimized vertical profile and the optimized speed profile determined by the trajectory generator 210 may be output or otherwise provided by the FMS 202 to a flight control system (e.g., FCS 118) for autonomously operating the aircraft, as will be appreciated in the art.

As described in greater detail below in the context of FIG. 3, in exemplary embodiments, the FMS 202 continually or periodically monitors the current state of the aircraft (e.g., output to the FMS 116, 202 by the navigation system 114) for deviations from the optimal vertical profile and/or the optimal speed profile. Based on the nature of the deviation (s), the trajectory generator 210 is configured to generate, construct, or otherwise determine a recommended flight path for reducing the deviation(s) and recapturing the optimal vertical profile and the optimal speed profile while satisfying upcoming flight plan constraints by varying the potential and/or kinetic energy of the aircraft in accordance with one or more energy management strategies. In this regard, the FMS 202 includes a vertical speed management system (or vertical speed manager) 212 configured to support a variable vertical speed of the aircraft along the recommended flight path, a deceleration rate energy management system (or deceleration rate manager) 214 configured to support a variable deceleration rate along the recommended flight path, and an energy sharing management system (or energy sharing manager) 216 configured to support a variable ratio of the change in potential energy to the change in kinetic energy along the recommended flight path.

The vertical speed manager 212 generally represents the process, service, software or firmware component that is executed, generated or otherwise implemented by the FMS 202 to calculate or otherwise determine a vertical speed value on a per-segment basis based on inputs pertaining to the current aircraft state, with the respective vertical speed values being utilized by the trajectory generator 210 to incrementally construct the recommended flight path forward from the current aircraft state when the current altitude of the aircraft is below the targeted altitude for the current aircraft location according to the optimal vertical profile. In this regard, the vertical speed value output by the vertical speed manager 212 represents the minimum descent rate (or minimum downward vertical speed) achievable for the aircraft for the given segment, which, in turn, may be utilized to by the trajectory generator 210 to calculate or otherwise determine altitude and speed profiles that minimize the vertical speed in descent to reduce the altitude difference between the aircraft altitude and the optimal aircraft altitude according to the optimal vertical profile. In exemplary embodiments, the vertical speed value output by the vertical speed manager 212 is calculated or otherwise determined based on the altitude difference between the current altitude of the aircraft at the start of the respective segment and the targeted altitude for the aircraft at that location according to the optimal vertical profile, the current or expected drag configuration of the aircraft at the start of the respective segment, and the current or expected weight of the aircraft at the start of the respective segment. The calculated vertical speed value may also be influenced by the meteorological conditions associated with the segment and any difference between the current speed of the aircraft at the start of the respective segment and the targeted speed according to the optimal speed profile. For example, when the current speed of the aircraft at the start of the respective segment is less than the targeted speed according to the optimal speed profile, the calculated vertical speed value may account for the increase in thrust needed to reduce the speed deviation over the length of the segment, or vice versa.

The deceleration rate manager 214 generally represents the process, service, software or firmware component that is executed, generated or otherwise implemented by the FMS 202 to calculate or otherwise determine a maximum deceleration rate value on a per-segment basis based on inputs pertaining to the current aircraft state, with the respective maximum deceleration rate values being utilized by the trajectory generator 210 to incrementally construct the recommended flight path forward from the current aircraft state when the current speed of the aircraft is above the targeted speed for the current aircraft location according to the optimal speed profile. In this regard, the maximum deceleration rate value output by the deceleration rate manager 214 represents the maximum deceleration rate achievable for the aircraft for the given segment, which, in turn, may be utilized to by the trajectory generator 210 to calculate or otherwise determine altitude and speed profiles that reduce the deviation(s) between the current aircraft energy state and the optimal aircraft energy state according to the optimal vertical and speed profiles. Conversely, in other scenarios, when the current speed of the aircraft is above the targeted speed for the current aircraft location according to the optimal speed profile, the deceleration rate manager 214 may be configured to calculate or otherwise determine a maximum acceleration rate value (or minimum deceleration rate) on a per-segment basis based on inputs pertaining to the current aircraft state, with the respective maximum acceleration rate values being utilized by the trajectory generator 210 to incrementally construct the recommended flight path forward from the current aircraft state. In exemplary embodiments, the maximum deceleration rate value output by the vertical speed manager 212 is calculated or otherwise determined based on the difference between the current speed of the aircraft at the start of the respective segment and the targeted speed according to the optimal speed profile, the current or expected drag configuration of the aircraft at the start of the respective segment, the current or expected airbrake setting or configuration at the start of the respective segment, and the current or expected weight of the aircraft at the start of the respective segment.

The energy sharing manager 216 generally represents the process, service, software or firmware component that is executed, generated or otherwise implemented by the FMS 202 to calculate or otherwise determine a maximum energy sharing ratio on a per-segment basis based on inputs pertaining to the current aircraft state, with the respective maximum energy sharing ratio being utilized by the trajectory generator 210 to incrementally construct the recommended flight path forward from the current aircraft state when the current altitude of the aircraft is above the targeted altitude for the current aircraft location according to the optimal vertical profile. In this regard, the maximum energy sharing ratio represents the maximum achievable ratio for the reduction in potential energy of the aircraft (e.g., via changing the flight path angle or pitch to reduce altitude) with respect to a corresponding reduction in kinetic energy of the aircraft (e.g., via airbrakes, an increased drag configuration, a headwinds, and/or the like). In exemplary embodiments, the energy sharing ratio value output by the energy sharing manager 216 is calculated or otherwise determined based on the difference between the current speed of the aircraft at the start of the respective segment and the targeted speed according to the optimal speed profile, the current or expected drag configuration of the aircraft at the start of the respective segment, the current or expected airbrake setting or configuration at the start of the respective segment, and the current or expected weight of the aircraft at the start of the respective segment. For example, the energy sharing manager 216 may be configured to determine the amount of change in altitude is required to support a desired change in airspeed over the length of the segment based on the various inputs to the energy sharing manager 216 and the length of the respective segment. For example, if the length of the segment is two nautical miles and the amount of speed to be reduced over the segment is ten knots, the energy sharing manager 216 calculates or otherwise determines an energy sharing ratio that is configured to alter the altitude by an amount that achieves the desired speed reduction (e.g., by altering the rate of descent to decrease or increase the amount of potential energy transferred to kinetic energy).

When the aircraft is descending (e.g., in a descent or approach flight phase), the FMS 202 is configured to initiate or otherwise trigger the trajectory generator 210 determining a recommended flight path for recapturing the reference descent strategy defined by the optimal vertical and speed profiles in response to a deviation between the current aircraft energy state and the targeted energy state for the current location of the aircraft according to the reference descent strategy. Based on the current state of the aircraft with respect to the reference descent strategy, the FMS 202 and/or the trajectory generator 210 identifies or otherwise determines which of the energy management strategies corresponding to the different management systems 212, 214, 216 should be utilized for recapturing the reference descent strategy. After identifying the energy management strategies to be utilized, the trajectory generator 210 constructs a recommended flight path for recapturing the reference descent strategy in a piecewise manner forward from the current aircraft location until intercepting the reference descent strategy. For each segment, the trajectory generator 210 provides current or expected values for aircraft state parameters or variables at the start of the respective segment to the identified energy management system 212, 214, 216, which, in turn, calculates or otherwise determines the constraining value for the respective energy management parameter associated with that energy management system 212, 214, 216 to be utilized for constructing the respective segment.

For example, when the current aircraft altitude is below the targeted altitude for the reference descent strategy, the vertical speed manager 212 may provide the minimum vertical speed for descending from the current aircraft altitude (e.g., based on the current aircraft drag configuration, the current aircraft weight, and the like), which, in turn, may be utilized by the trajectory generator 210 to determine a corresponding altitude and speed profile for the length of the initial segment from the current aircraft location that achieves that minimum downward vertical speed (or minimum descent rate) using aerodynamic models, aircraft performance predictions, meteorological information for the segment, and/or the like. When the initial segment does not result in recapturing the reference descent strategy, the trajectory generator 210 may input or otherwise provide the expected state of the aircraft at the end of that initial segment (e.g., the expected aircraft drag configuration, the predicted aircraft weight, and the like) to the vertical speed manager 212, which provides the minimum vertical speed for descending along the next segment of the recommended flight path. In this regard, the minimum vertical speed for the second segment of the recommended flight path may vary or otherwise be different from the minimum vertical speed utilized to construct the initial segment of the recommended flight path. In a similar manner, the trajectory generator 210 determines corresponding altitude and speed profiles for the length of the second segment starting from the end of the initial segment that achieves its determined minimum downward vertical speed (or minimum descent rate) using aerodynamic models, aircraft performance predictions, meteorological information for the segment, and/or the like. The trajectory generator 210 repeats incrementally constructing segments forward until recapturing the reference descent strategy.

Figure 3:
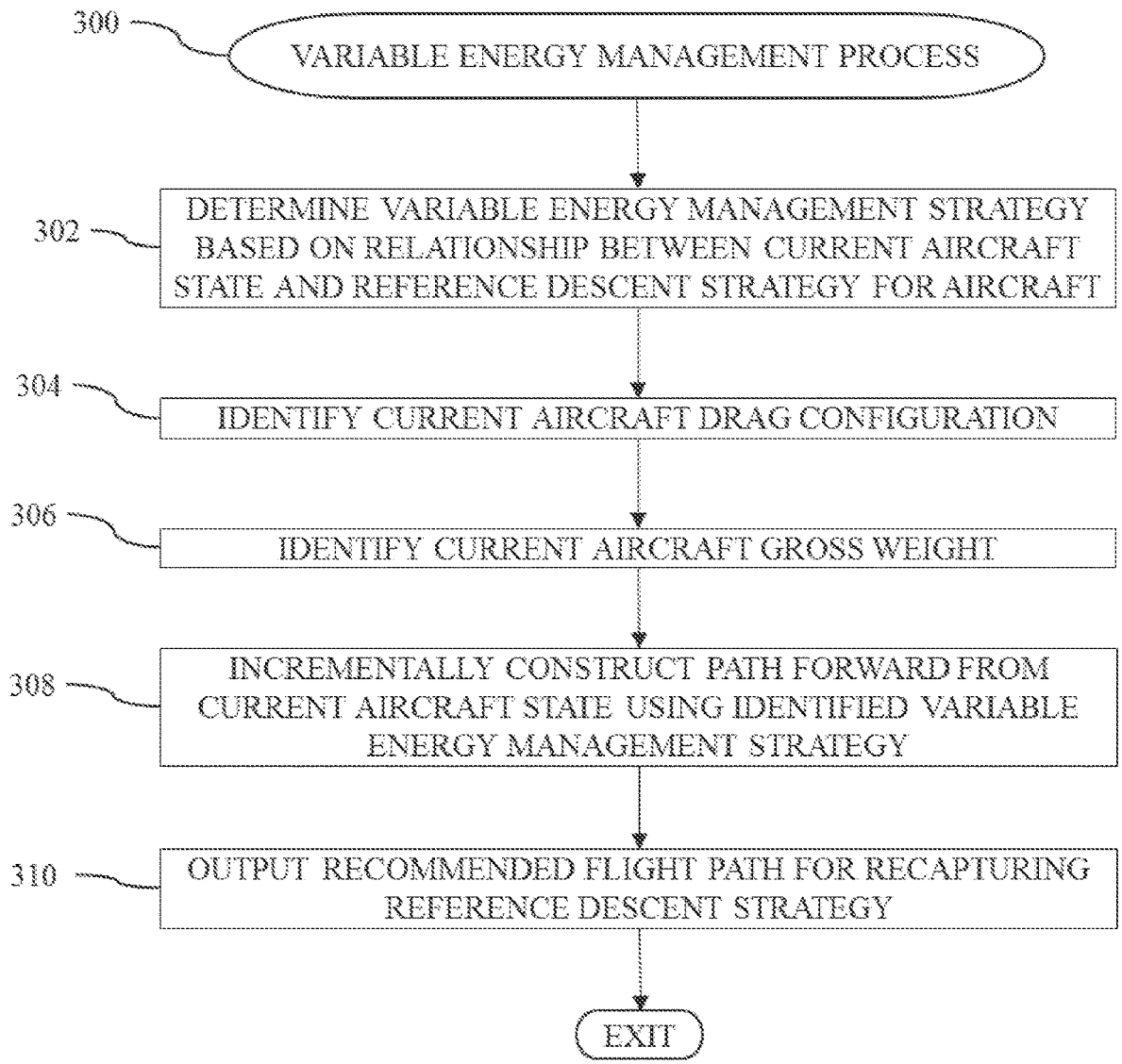
FIG. 3 is a flow diagram of an exemplary variable energy management process suitable for use with the trajectory projection system of FIG. 2 or the aircraft in the system of FIG. 1 in accordance with one or more embodiments.

Referring now to FIG. 3, in one or more exemplary embodiments, a FMS or another component of an aircraft system is configured to support a variable energy management process 300 to provide guidance for managing an aircraft energy state and/or autonomously operating an aircraft to return to a targeted energy state in compliance with flight plan constraints. The various tasks, functions, and operations described below as being performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of the variable energy management process 300 may be performed by different elements of an aircraft system 100, such as, for example, the processing system 108, the display system 110, the navigation system 114, the FMS 116, 202, the FCS 118, and/or other onboard avionics system(s) 120. It should be appreciated that the variable energy management process 300 may include any number of additional or alternative tasks, the tasks need not be performed in the illustrated order and/or the tasks may be performed concurrently, and/or the variable energy management process 300 may be incorporated into a more comprehensive procedure or process having additional functionality not described in detail herein. Moreover, one or more of the tasks shown and described in the context of FIG. 3 could be omitted from a practical embodiment of the variable energy management process 300 as long as the intended overall functionality remains intact.

Referring to FIG. 3, and with continued reference to FIGS. 1-2, in exemplary embodiments, the illustrated variable energy management process 300 initializes or otherwise begins in response to a deviation from an originally-planned trajectory for the aircraft 102 while the aircraft 102 is in a descent or approach flight phase. For example, a pilot may manually operate an aircraft 102 to deviate from an originally-planned trajectory based on meteorological conditions, ATC instructions, air traffic or collision avoidance warnings, and/or the like. As described above, in exemplary embodiments, the originally-planned trajectory is realized as an optimal descent strategy determined by a FMS 116, 202 using a cost function or cost index that includes an optimal vertical profile configured to satisfy any altitude constraints or other stabilization constraints associated with a flight plan for the aircraft 102 and an optimal speed profile configured to satisfy any speed constraints, RTA constraints, and/or other stabilization constraints associated with the flight plan for the aircraft 102. Thus, the optimal descent strategy provides a reference for the aircraft trajectory that achieves the desired tradeoffs between fuel consumption, travel time, noise, passenger comfort, and/or the like while also satisfying stabilization criteria and other safety-related constraints. In this regard, the variable energy management process 300 may be performed to provide guidance to the pilot for how to manually fly the aircraft 102 to recapture the originally-planned descent strategy or to allow the pilot to engage an autonomous operating mode that can autonomously operate the aircraft 102 to recapture the originally-planned descent strategy, and thereby achieve the desired cost minimization or efficiency of operation.

The variable energy management process 300 identifies or otherwise one or more variable energy management strategies to be utilized to recapture the reference descent strategy based on the deviation between the current energy state of the aircraft and the targeted energy state for the aircraft at the current location of the aircraft according to the reference descent strategy (task 302). In this regard, the variable energy management strategy (or combination thereof) varies depending on the nature of the difference between the current aircraft energy state and the targeted energy state, that is, whether the current aircraft altitude is too high or too low and/or whether the current aircraft speed is too fast or too slow. When the current aircraft altitude is below the targeted altitude according to the vertical profile for the optimal descent strategy at the current aircraft location, the FMS 116, 202 and/or the processing system 108 identifies the variable vertical speed energy management strategy corresponding to the vertical speed manager 212 as a variable energy management strategy to be utilized to recapture the optimal vertical profile. If the current aircraft speed is also above the targeted speed according to the speed profile for the optimal descent strategy at the current aircraft location, the FMS 116, 202 and/or the processing system 108 identifies the variable deceleration rate energy management strategy corresponding to the deceleration rate manager 214 as a variable energy management strategy to be utilized to recapture the optimal speed profile in concert with the variable vertical speed energy management strategy. Conversely, when the current aircraft altitude is above the targeted altitude according to the vertical profile for the optimal descent strategy at the current aircraft location, the FMS 116, 202 and/or the processing system 108 identifies the variable energy sharing strategy corresponding to the energy sharing manager 216 as a variable energy management strategy to be utilized in concert with the variable deceleration rate energy management strategy corresponding to the deceleration rate manager 214 to recapture the optimal vertical profile. On the other hand, when the current aircraft altitude is at the targeted altitude but the current aircraft speed is above the targeted speed according to the speed profile for the optimal descent strategy, the FMS 116, 202 and/or the processing system 108 identifies the variable deceleration rate energy management strategy corresponding to the deceleration rate manager 214 as a variable energy management strategy to be utilized to recapture the optimal speed profile. Conversely, when the current aircraft speed is below the targeted speed according to the speed profile for the optimal descent strategy, the FMS 116, 202 and/or the processing system 108 identifies the variable deceleration rate energy management strategy corresponding to the deceleration rate manager 214 as a variable energy management strategy to be utilized to recapture the optimal speed profile, with the deceleration rate manager 214 outputting a maximum acceleration rate (or minimum deceleration rate) for a respective segment when the difference between the current aircraft speed and the targeted aircraft speed is negative.

After identifying the variable energy management strategy or combination of variable energy management strategies to be utilized to mitigate the current aircraft energy state deviation(s) and recapture the reference descent strategy, the variable energy management process 300 identifies or otherwise obtains the current aircraft drag configuration (task 304). In this regard, the FMS 116, 202 and/or the processing system 108 identifies the current flap extension position, the current landing gear position, and the current airbrake setting. The variable energy management process 300 also identifies or otherwise obtains the current gross weight of the aircraft (task 306). For example, the FMS 116, 202 and/or the processing system 108 may obtain the current amount of fuel remaining onboard the aircraft 102, and then calculate or otherwise determine an estimate for the current gross weight of the aircraft based on the current amount of fuel remaining.

After identifying the current aircraft drag configuration and current aircraft gross weight, the variable energy management process 300 incrementally constructs segments for the recommended flight path for recapturing the reference descent strategy forward from the current aircraft position using the one or more variable energy management strategies identified based on the current energy state deviation(s) (task 308). In this regard, the trajectory generator 210 determines a sequence of navigational segments for incrementally operating the aircraft 102 in accordance with the applicable variable energy management strategies until the recommended flight path intercepts the reference descent strategy. In one or more exemplary embodiments, the navigational segments have a fixed length; that said, it should be noted that the subject matter described herein is not limited to fixed length navigational segments and can be implemented in an equivalent manner using variable length navigational segments. Additionally, it should be noted that the navigational segments that define the recommended flight path are not necessarily associated with any waypoints or other navigational reference points of the flight plan.

For the initial segment of the recommended flight path, the trajectory generator 210 inputs or otherwise provides, to the identified ones of the variable energy management systems 212, 214, 216 information characterizing the current state of the aircraft 102 at the start of the segment, including, for example, the current drag configuration of the aircraft 102, the current gross weight of the aircraft 102, the current speed of the aircraft 102, the current difference (if any) between the current speed of the aircraft 102 and the targeted speed for the aircraft 102 according to the optimal speed profile for originally-planned reference descent strategy, and the current difference (if any) between the current altitude of the aircraft 102 and the targeted altitude for the aircraft 102 according to the optimal vertical profile for originally-planned reference descent strategy. Based on the input information, the respective variable energy management system 212, 214, 216 calculates or otherwise determines a constraining value for its associated energy management parameter for the upcoming segment that is output back to the trajectory generator 210 for use in constructing the segment. In this regard, the trajectory generator 210 utilizes the constraining value(s) provided by the identified variable energy management system(s) 212, 214, 216 to be utilized for a respective segment to determine the corresponding changes in aircraft altitude, airspeed, and the like that achieve the constraining value.

In exemplary embodiments, the variable energy management systems 212, 214, 216 utilize the current aircraft speed and current drag configuration to identify or otherwise determine whether a drag configuration change should occur based on the allowed aircraft speeds for the current drag configuration and/or the next drag configuration (e.g., the maximum and/or minimum allowed speeds for the respective drag configuration). In this regard, for situations where the current aircraft altitude is below the target altitude and/or the current aircraft speed is below the targeted aircraft speed, the variable energy management systems 212, 214, 216 may be configured to delay a transition to the next drag configuration until reaching the minimum allowable aircraft speed for the current drag configuration. Conversely, for situations where the current aircraft altitude is above the target altitude and/or the current aircraft speed is above the targeted aircraft speed, the variable energy management systems 212, 214, 216 may be configured to advance a transition to the next drag configuration once the maximum allowable aircraft speed for the next drag configuration is reached. Based on the current drag configuration and/or the expected drag configuration change and the other input parameters received from the trajectory generator 210, the variable energy management systems 212, 214, 216 calculate or otherwise determine the output value for its associated energy management parameter for the upcoming segment that minimizes and/or maximizes the reduction in the aircraft energy over the segment according to the nature of the deviations between the current aircraft energy state and the targeted energy state.

Based on the constraining energy management parameter values and configuration change indicia (if any) output by the variable energy management systems 212, 214, 216, the trajectory generator 210 constructs or otherwise generates corresponding speed and altitude profiles for the segment, for example, by optimizing the flight path angle and the speed profile to achieve the constraining energy management parameter value using the appropriate drag configuration(s) for the segment. In this regard, the trajectory generator 210 utilizes one or more aerodynamic models to model or otherwise predict the performance of the aircraft along the planned lateral trajectory as a function of the current aircraft gross weight at the start of the segment, the current fuel remaining at the start of the segment, any forecasted and/or expected meteorological conditions along the segment, and then varies or otherwise optimizes the vertical and speed profiles for the fixed length segment that satisfy the constraining energy management parameter values output by the variable energy management systems 212, 214, 216. The resulting vertical and speed profiles may then be utilized to define the initial segment of the recommended flight path for recapturing the reference descent strategy. In some embodiments, the trajectory generator 210 may utilize any applicable altitude, speed, RTA, and/or other constraints along the respective segment to arrive at the optimal vertical and speed profiles that satisfy (or do not violate) any of the constraints.

After determining vertical and speed profiles for the initial segment, the trajectory generator 210 iteratively repeats the process of providing, to the identified ones of the variable energy management systems 212, 214, 216, information characterizing the expected state of the aircraft 102 at the start of the segment to be constructed, obtaining updated output values for the energy management parameter values associated with the respective variable energy management systems 212, 214, 216 for the segment to be constructed, and then optimizing the vertical and speed profiles for the segment being constructed in accordance with those updated output values. In this regard, the expected altitude and speed values for the aircraft 102 that are expected to result from the preceding segment (e.g., the end points of the vertical and speed profiles for the preceding segment) may be utilized to determine an updated difference (if any) between the expected speed of the aircraft 102 at the end of the preceding segment and the targeted speed for the aircraft 102 at that location according to the optimal speed profile for originally-planned reference descent strategy and an updated difference (if any) between the expected altitude of the aircraft 102 at the end of the preceding segment and the targeted altitude for the aircraft 102 at that location according to the optimal vertical profile for originally-planned reference descent strategy. Thus, as the preceding segments reduce the deviation from the originally-planned reference descent strategy, the energy management parameter values used to construct the recommended flight path may vary as the recommended flight path gets closer to intercepting the reference descent strategy.

In a similar manner as described above for the initial segment, the trajectory generator 210 utilizes one or more aerodynamic models to model or otherwise predict the performance of the aircraft along each respective segment of the recommended flight path as a function of the expected aircraft gross weight at the start of the segment, the expected fuel remaining at the start of the segment, and any forecasted and/or expected meteorological conditions along the segment, and then varies or otherwise optimizes the vertical and speed profiles for the respective segment that satisfy the constraining energy management parameter values output by the variable energy management systems 212, 214, 216 for that segment. In this manner, the trajectory generator 210 incrementally and iteratively constructs segments for the recommended flight path forward from the initial aircraft energy state and initial aircraft location to progressively reduce deviations between the expected aircraft energy state and the targeted energy state until the speed and altitude deviations reach zero, thereby indicating that the recommended flight path has recaptured the reference descent strategy.

Still referring to FIG. 3, after determining vertical and speed profiles for the segments that define the recommended flight path for recapturing the reference descent strategy, the variable energy management process 300 generates or otherwise provides an output indicative of the recommended flight path (task 310). For example, in one or more embodiments, the FMS 116, 202 generates or otherwise provides a graphical representation of the vertical profile and the speed profile for the recommended flight path on the display device 104, which, in turn, may be utilized by a pilot to manually fly the aircraft 102 to recapture the reference descent strategy. In this regard, the displayed graphical representation of the recommended flight path depicts the different segments that make up the recommended flight path on the respective vertical and speed profile displays, where the respective slopes of the vertical profile and/or the speed profile of the respective segments may vary from one to another to reflect the variable energy management parameter value(s) for the respective segment. In some embodiments, where a pilot engages or otherwise activates an autonomous operating mode, such as a VNAV operating mode, the FMS 116, 202 outputs or otherwise provides the vertical profile and the speed profile for the recommended flight path to the FCS 118, which, in turn, autonomously operates the aircraft 102 in accordance with the vertical and speed profiles for the different segments of the recommended flight path. In this regard, the subject matter described herein may be utilized to autonomously recapture an originally-planned and previously-optimized descent strategy computed by the FMS 116, 202 to restore operation with the desired cost index or cost optimization.

Figure 4:
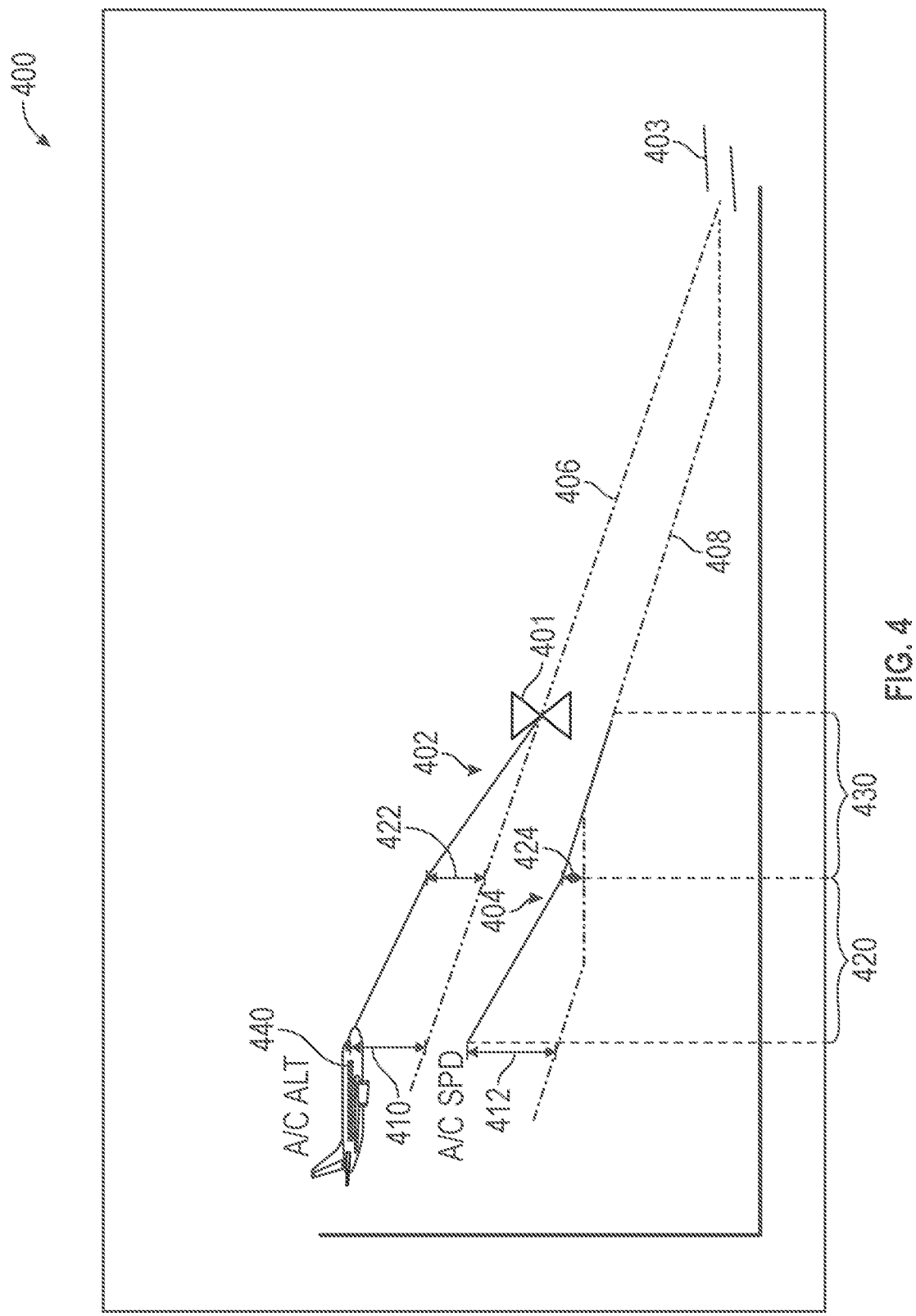
FIGS. 4-5 depicts graphs of exemplary flight paths constructed in accordance with the variable energy management process in accordance with one or more exemplary embodiments.

FIG. 4 is a graph 400 depicting a graphical representation of a vertical profile 402 for a recommended flight path constructed in accordance with the variable energy management process 300 and with a graphical representation of a speed profile 404 for a recommended flight path constructed in accordance with the variable energy management process 300 with respect to the distance to go before reaching a destination airport 403. The graph 400 also includes graphical representations of an optimal vertical profile 406 and an optimal speed profile 408 corresponding to the reference descent strategy en route to the airport 403 that was previously computed and optimized by the FMS 116, 220 and configured to satisfy an upcoming AT altitude constraint 401 in advance of the airport 403. Based on the altitude difference 410 between the current aircraft altitude and the target aircraft altitude according to the optimal vertical profile 406 indicating the aircraft altitude is too high (or above the target altitude) and the speed difference 412 between the current aircraft speed and the target aircraft speed according to the optimal speed profile 408 indicating the aircraft 102 is flying too fast, the variable energy management process 300 identifies the deceleration rate energy management strategy for reducing the speed difference 412 and the variable energy sharing energy management strategy for reducing the altitude difference 410 (e.g., task 306).

Referring to FIG. 4 with continued reference to FIGS. 1-3, in a similar manner as described above, for the initial segment 420 of the recommended flight path, the trajectory generator 210 inputs or otherwise provides information characterizing the current state of the aircraft 102 at the start of the segment to the deceleration rate manager 214 and the energy sharing manager 216. Based on the initial input information, the deceleration rate manager 214 calculates or otherwise determines a maximum deceleration rate for the initial segment 420 and provides that initial deceleration rate value to the trajectory generator 210. Similarly, the variable energy sharing management system 216 calculates or otherwise determines an energy sharing ratio for the relationship between the reduction of potential energy over the upcoming segment and the reduction of kinetic energy over the upcoming segment and provides that initial energy sharing ratio value to the trajectory generator 210. The trajectory generator 210 utilizes the constraining deceleration rate value provided by the deceleration rate manager 214 and the constraining energy sharing ratio value provided by the energy sharing manager 216 to construct or otherwise generate corresponding speed and altitude profiles for the initial segment 420. In this regard, the trajectory generator 210 optimizes flight path angle and the speed profile for the initial segment 420 to achieve the energy sharing ratio output by the energy sharing manager 216 given the deceleration rate output by the deceleration rate manager 214 using the appropriate drag configuration(s) for the initial segment 420, the current aircraft gross weight at the start of the initial segment 420, the current fuel remaining at the start of the initial segment 420, and any forecasted and/or expected meteorological conditions along the initial segment 420.

After determining vertical and speed profiles for the initial segment 420, the trajectory generator 210 iteratively repeats by constructing a second segment 430 forward from the end of the initial segment 420. In this regard, the trajectory generator 210 may utilize aerodynamic models to predict, estimate, or otherwise determine the expected gross weight of the aircraft 102 and/or the expected fuel remaining onboard the aircraft 102 at the end of the preceding initial segment 420. The trajectory generator 210 may utilize the vertical profile and speed profile constructed for the initial segment 420 determine an updated speed difference 424 between the expected speed of the aircraft 102 at the start of the second segment 430 and the targeted speed at that location according to the optimal speed profile 408 for originally-planned reference descent strategy, and the updated altitude difference 422 between the expected altitude of the aircraft 102 at the start of the second segment 430 and the targeted altitude according to the optimal vertical profile 406.

The trajectory generator 210 inputs or otherwise provides information characterizing the expected state of the aircraft 102 at the start of the second segment 430 (e.g., the expected altitude difference 422, the expected speed difference 424, the expected gross weight and/or fuel remaining, the expected drag configuration, etc.) to the deceleration rate manager 214 and the energy sharing manager 216, which, in turn, provide updated maximum deceleration rate and energy sharing ratio values for the second segment 430. In this regard, the updated variable energy management parameter values are influenced by the expected deviations 422, 424 from the optimal descent profiles 406, 408, which are different from the initial deviations 410, 412, and accordingly, the constraining values for the identified variable energy management parameters utilized to construct the second segment 430 may vary from the variable energy management parameter values used to construct the initial segment 420. As a result, the slopes of the optimized vertical and speed profiles for the second segment 430 to achieve the updated constraining values may vary from the optimized vertical and speed profiles for the preceding segment 420 of the recommended flight path. For example, as depicted in FIG. 4, the second segment 430 may descend at a steeper flight path angle than was used for the initial segment 420, but the speed may decelerate slower over the second segment 430 than the initial segment 420.

In the illustrated embodiment of FIG. 4, the recommended flight path composed of first and second segments 420, 430 intersects or otherwise intercepts the optimal vertical profile 406 at the AT altitude constraint 401 thereby ensuring the aircraft 102 satisfies the AT altitude constraint 401, while also intersecting or otherwise intercepting the optimal speed profile 408 in advance of at the AT altitude constraint 401, thereby allowing the aircraft 102 to recapture the reference descent strategy. As a result, the aircraft 102 can proceed from the AT altitude constraint 401 en route to the airport 403 in accordance with the descent strategy that is optimized to achieve the desired cost and satisfy any subsequent constraints (e.g., altitude, speed, stabilization, and/or the like). In this regard, it should be noted that although FIG. 4 depicts a simplified scenario that includes only two segments 420, 430, in practice, the recommended flight path may include any number of segments having any desired length.

As described above, after completing construction of the recommended flight path that recaptures the reference descent strategy, the FMS 116, 202 and/or the variable energy management process 300 may be configured to display or otherwise present the graph 400 of the variable energy management vertical and speed profiles 402, 404 constructed for the segments 420, 430 of the recommended flight path on the display device 104. In this regard, the displayed graph 400 may also include a graphical representation 440 of the aircraft 102 at the current aircraft altitude with respect to a graphical representation of the optimal vertical profile 406 to provide the pilot with situational awareness of the current altitude deviation 410 and the recommended sequence of flight path angles for recapturing the optimal vertical profile 406. The graphical representation of the recommended recapture speed profile 404 for the recommended flight path may also be depicted with respect to the graphical representation of the optimal speed profile 408 to provide the pilot with situational awareness of the current speed deviation 412 and the recommended sequence of deceleration. The graph 400 depicted on the display device 104 may also include graphical indicia of the variable energy management strategies identified by the variable energy management process 300 and utilized to construct the recommended profiles 402, 404 (e.g., variable deceleration rate and variable energy sharing). Additionally, although not illustrated in FIG. 4, in practice, any earlier drag configuration changes that are indicated, identified, or otherwise recommended by the identified variable energy management systems 214, 216 may also be displayed or otherwise presented to the pilot on the graph 400, thereby providing the pilot with situational awareness of when a drag configuration change is recommended or required for recapturing the optimal descent strategy. In some embodiments, the pilot may enable an autonomous operating mode, such as a VNAV descent, which, in turn results in the FCS 118 utilizing the vertical and speed profiles 402, 404 constructed by the variable energy management process 300 to autonomously operate the aircraft 102 (e.g., via commands provided to the autopilot and thrust manager) to recapture the optimal descent profiles 406, 408. Once the aircraft 102 recaptures the original optimal descent strategy, the FCS 118 may transition from using variable energy management strategies to autonomous operation in accordance with the optimal descent strategy.

Figure 5:
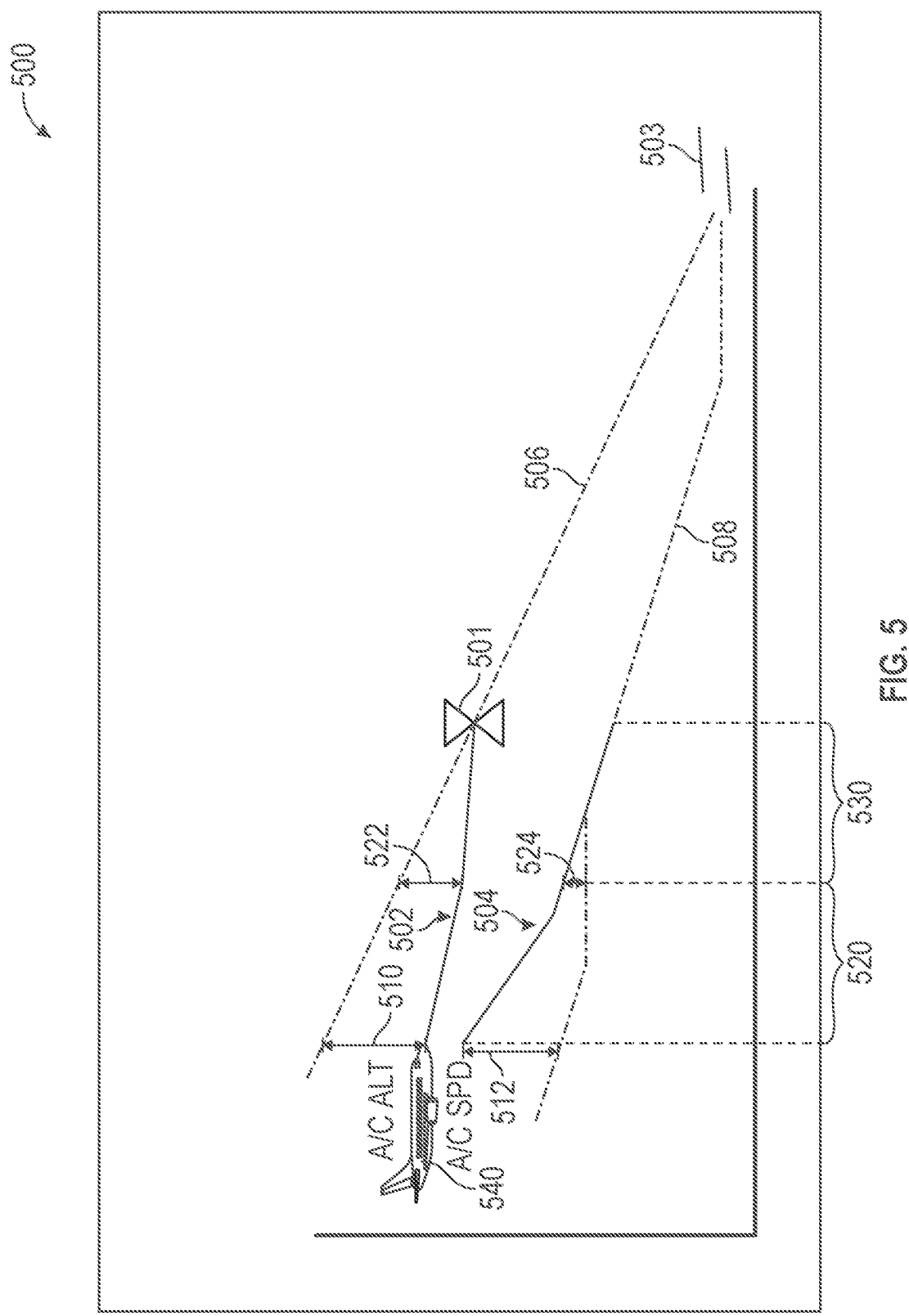

FIG. 5 is another embodiment of a graph 500 depicting a graphical representation of a vertical profile 502 for a recommended flight path constructed in accordance with the variable energy management process 300 and with a graphical representation of a speed profile 504 for a recommended flight path constructed in accordance with the variable energy management process 300 with respect to an optimal vertical profile 506 and an optimal speed profile 508 corresponding to the reference descent strategy en route to an airport 503 that was previously computed and optimized by the FMS 116, 220 and configured to satisfy an upcoming AT altitude constraint 501 in advance of the airport 503. Based on the altitude difference 510 between the current aircraft altitude and the target aircraft altitude according to the optimal vertical profile 506 indicating the aircraft altitude is too low (or below the targeted altitude) and the speed difference 512 between the current aircraft speed and the target aircraft speed according to the optimal speed profile 508 indicating the aircraft 102 is flying too fast, the variable energy management process 300 identifies the variable deceleration rate energy management strategy for reducing the speed difference 512 and the variable vertical speed strategy for reducing the altitude difference 510 to restore the aircraft 102 to the optimal vertical profile 506 (e.g., task 306).

Referring to FIG. 5 with continued reference to FIGS. 1-3, in a similar manner as described above, for the initial segment 520 of the recommended flight path, the trajectory generator 210 inputs or otherwise provides information characterizing the current state of the aircraft 102 at the start of the segment to the vertical speed manager 212 and the deceleration rate manager 214. Based on the initial input information, the deceleration rate manager 214 calculates or otherwise determines a maximum deceleration rate for the initial segment 520 and provides that initial deceleration rate value to the trajectory generator 210. Similarly, the vertical speed manager 212 calculates or otherwise determines a minimum descent rate (or downward vertical speed) for the aircraft 102 given the maximum deceleration rate and the other input information and provides that constraining vertical speed value to the trajectory generator 210. The trajectory generator 210 utilizes the constraining vertical speed value provided by the vertical speed manager 212 and the constraining deceleration rate value provided by the deceleration rate manager 214 to construct or otherwise generate corresponding speed and altitude profiles for the initial segment 520. In this regard, the trajectory generator 210 optimizes flight path angle and the speed profile for the initial segment 520 to achieve the vertical speed value output by the vertical speed manager 212 given the deceleration rate output by the deceleration rate manager 214 using the appropriate drag configuration(s) for the initial segment 520, the current aircraft gross weight at the start of the initial segment 520, the current fuel remaining at the start of the initial segment 520, and any forecasted and/or expected meteorological conditions along the initial segment 520.

After determining vertical and speed profiles for the initial segment 520, the trajectory generator 210 iteratively repeats by constructing a second segment 530 forward from the end of the initial segment 520. As described above, the trajectory generator 210 utilizes the vertical profile and speed profile constructed for the initial segment 520 determine an updated speed difference 524 between the expected speed of the aircraft 102 at the start of the second segment 522 and the targeted speed at that location according to the optimal speed profile 508 for originally-planned reference descent strategy, and the updated altitude difference 522 between the expected altitude of the aircraft 102 at the start of the second segment 522 and the targeted altitude according to the optimal vertical profile 506. The trajectory generator 210 inputs or otherwise provides information characterizing the expected state of the aircraft 102 at the start of the second segment 530 (e.g., the expected altitude difference 522, the expected speed difference 524, the expected gross weight and/or fuel remaining, the expected drag configuration, etc.) to the vertical speed manager 212 and the deceleration rate manager 214, which, in turn, provide updated maximum deceleration rate and constraining vertical speed values for the second segment 530. As described above, by virtue of the constraining variable energy management parameter values varying on a per-segment basis, the slopes of the optimized vertical and speed profiles for the second segment 530 to achieve the updated constraining values may vary from the optimized vertical and speed profiles for the preceding segment 520 of the recommended flight path. For example, as depicted in FIG. 5, the second segment 530 may descend at a shallower flight path angle than was used for the initial segment 520, and the speed may decelerate slower over the second segment 530 than the initial segment 520.

In the illustrated embodiment of FIG. 5, the recommended flight path composed of first and second segments 520, 530 intersects or otherwise intercepts the optimal vertical profile 506 at the AT altitude constraint 501 thereby ensuring the aircraft 102 satisfies the AT altitude constraint 501, while also intersecting or otherwise intercepting the optimal speed profile 508 in advance of at the AT altitude constraint 501, thereby allowing the aircraft 102 to recapture the reference descent strategy. Again, it should be noted that although FIG. 5 depicts a simplified scenario that includes only two segments 520, 530, in practice, the recommended flight path may include any number of segments having any desired length.

As described above, after completing the recommended flight path, the FMS 116, 202 and/or the variable energy management process 300 may be configured to display or otherwise present the graph 500 of the variable energy management vertical and speed profiles 502, 504 constructed for the segments 520, 530 of the recommended flight path on the display device 104. The graph 500 depicted on the display device 104 may also include graphical indicia of the variable energy management strategies identified by the variable energy management process 300 and utilized to construct the recommended profiles 502, 504 (e.g., variable vertical speed and deceleration rate). Additionally, although not illustrated in FIG. 5, in practice, any delayed drag configuration changes that may be indicated, identified, or otherwise recommended by the identified variable energy management systems 212, 214 may also be displayed or otherwise presented to the pilot on the graph 500. When an autonomous operating mode such as a VNAV descent is activated or enabled, the FMS 116, 202 provides the recommended vertical and speed profiles 502, 504 constructed by the variable energy management process 300 to the FCS 118, with the FCS 118 utilizing the vertical and speed profiles 502, 504 to autonomously operate the aircraft 102 to recapture the optimal descent profiles 506, 508.

By virtue of the subject matter described herein, a pilot may be apprised of how the aircraft can be operated to recapture an originally-planned and cost-optimized descent strategy when it may not otherwise be apparent to the pilot whether or how the aircraft can be operated to vary the energy state of the aircraft to satisfy upcoming constraints and restore operation in accordance with the optimized descent strategy. Additionally, the variable energy management strategy allows an autonomous operating mode to be activated or otherwise enabled to autonomously return the aircraft to the optimal descent strategy, resulting in improved cost management and ensuring safety and compliance with applicable constraints.

For the sake of brevity, conventional techniques related to flight management, flight controls, flight planning, air traffic control, energy management, autopilot, autothrottle, or other automation, navigation systems, inertial reference systems, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of an aircraft en route to an airport, the method comprising:
   identifying a current altitude for the aircraft;
   identifying a current configuration of the aircraft;
   in response to a deviation between the current altitude for the aircraft and a target altitude according to a reference descent strategy:
      identifying a variable deceleration rate management strategy for determining a recommended flight path comprising a sequence of segments for recapturing the reference descent strategy and satisfying an upcoming constraint associated with the reference descent strategy from the current altitude based at least in part on the current configuration and the deviation; and
      incrementally generating the sequence of segments configured to recapture the reference descent strategy forward from a current location of the aircraft using the variable deceleration rate management strategy by:
         determining a maximum deceleration rate for a respective segment of the sequence of segments based at least in part on an aircraft drag configuration at the start of the respective segment and a respective deviation from the reference descent strategy at the start of the respective segment; and
         determining a respective combination of a vertical profile and a speed profile for the respective segment configured to reduce the respective deviation from the reference descent strategy and achieve the maximum deceleration rate, wherein:
            the respective combination of the vertical profile and the speed profile for the respective segment is configured to achieve the maximum deceleration rate for the respective segment; and
            the aircraft is autonomously operated in accordance with the respective combination of the vertical profile and the speed profile for the respective segment.

2. The method of claim 1, wherein the vertical profile is configured to vary a flight path angle along the sequence of segments.

3. The method of claim 1, wherein a slope of the speed profile varies along the sequence of segments.

4. The method of claim 1, wherein the vertical profile and the speed profile are cooperatively configured to vary at least one of kinetic energy or potential energy of the aircraft along the recommended flight path en route to the upcoming constraint by varying at least one of a vertical speed of the aircraft, a deceleration rate of the aircraft, and a ratio of the potential energy to the kinetic energy of the aircraft along the recommended flight path.

5. The method of claim 1, further comprising displaying a graphical representation of at least one of the vertical profile and the speed profile with respect to a graphical representation of the reference descent strategy.

6. The method of claim 1, further comprising providing, by a flight management system (FMS), the vertical profile and the speed profile to a flight control system (FCS), wherein the FCS autonomously operates the aircraft in accordance with the vertical profile and the speed profile.

7. An aircraft system comprising:
   a navigation system to provide a current altitude of an aircraft;
   a data storage element to maintain one or more constraints defining a flight plan for the aircraft; and
   a flight management system coupled to the navigation system and the data storage element to determine a reference trajectory based at least in part on the one or more constraints, identify a variable deceleration rate energy management strategy for reducing a difference between the current altitude and a target altitude according to the reference trajectory based on the difference, generate a recommended flight path for recapturing the reference trajectory using the variable deceleration rate energy management strategy, and autonomously operate the aircraft in accordance with the recommended flight path, wherein:
      the recommended flight path comprises a sequence of segments for recapturing the reference trajectory and satisfying an upcoming constraint associated with the reference trajectory from the current altitude based at least in part on a current configuration of the aircraft and the difference;
      each segment of the sequence of segments has a respective vertical profile and a respective speed profile associated therewith configured to reduce a respective deviation from the reference trajectory and achieve a maximum deceleration rate determined for the respective segment of the sequence of segments based at least in part on an aircraft drag configuration at the start of the respective segment and the respective deviation from the reference trajectory at the start of the respective segment; and
      the aircraft is autonomously operated in accordance with the respective combination of the vertical profile and the speed profile for the respective segment.

8. The system of claim 7, wherein the vertical profile is configured to vary a flight path angle along the sequence of segments.

9. The system of claim 7, wherein a slope of the speed profile varies along the sequence of segments.

10. The system of claim 7, wherein the vertical profile and the speed profile are cooperatively configured to vary at least one of kinetic energy or potential energy of the aircraft along the recommended flight path en route to the upcoming constraint by varying at least one of a vertical speed of the aircraft, a deceleration rate of the aircraft, and a ratio of the potential energy to the kinetic energy of the aircraft along the recommended flight path.

11. The system of claim 7, wherein the flight management system is configured to display a graphical representation of at least one of the vertical profile and the speed profile with respect to a graphical representation of the reference descent strategy on a display device.

12. The system of claim 7, wherein the flight management system is configured to provide the vertical profile and the speed profile to a flight control system (FCS), wherein the FCS autonomously operates the aircraft in accordance with the vertical profile and the speed profile.

13. A non-transitory computer-readable medium having computer-executable instructions stored thereon that, when executed by a processing system, are configurable to cause the processing system to:
  identify a current altitude for an aircraft;
  identify a current configuration of the aircraft;
  in response to a deviation between the current altitude for the aircraft and a target altitude according to a reference descent strategy:
    identify a variable deceleration rate management strategy for determining a recommended flight path comprising a sequence of segments for recapturing the reference descent strategy and satisfying an upcoming constraint associated with the reference descent strategy from the current altitude based at least in part on the current configuration and the deviation; and
    incrementally generating the sequence of segments configured to recapture the reference descent strategy forward from a current location of the aircraft using the variable deceleration rate management strategy by:
      determining a maximum deceleration rate for a respective segment of the sequence of segments based at least in part on an aircraft drag configuration at the start of the respective segment and a respective deviation from the reference descent strategy at the start of the respective segment; and
      determining a respective combination of a vertical profile and a speed profile for the respective segment configured to reduce the respective deviation from the reference descent strategy and achieve the maximum deceleration rate, wherein:
        the respective combination of the vertical profile and the speed profile for the respective segment is configured to achieve the maximum deceleration rate for the respective segment; and
        the aircraft is autonomously operated in accordance with the respective combination of the vertical profile and the speed profile for the respective segment.

14. The non-transitory computer-readable medium of claim 13, wherein the vertical profile is configured to vary a flight path angle along the sequence of segments.

15. The non-transitory computer-readable medium of claim 13, wherein a slope of the speed profile varies along the sequence of segments.

16. The non-transitory computer-readable medium of claim 13, wherein the vertical profile and the speed profile are cooperatively configured to vary at least one of kinetic energy or potential energy of the aircraft along the recommended flight path en route to the upcoming constraint by varying at least one of a vertical speed of the aircraft, a deceleration rate of the aircraft, and a ratio of the potential energy to the kinetic energy of the aircraft along the recommended flight path.

17. The non-transitory computer-readable medium of claim 13, wherein the computer-executable instructions are configurable to cause the processing system to display a graphical representation of at least one of the vertical profile and the speed profile with respect to a graphical representation of the reference descent strategy.

18. The non-transitory computer-readable medium of claim 13, wherein the computer-executable instructions are configurable to cause the processing system to provide the vertical profile and the speed profile to a flight control system (FCS), wherein the FCS autonomously operates the aircraft in accordance with the vertical profile and the speed profile.

* * * * *